United States Patent Office 2,801,269
Patented July 30, 1957

2,801,269

PERCHLOROCARBON HAVING THE EMPIRICAL FORMULA $C_{10}Cl_8$

Charles F. Baranauckas, Niagara Falls, N. Y., assignor to Hooker Electrochemical Company, Niagara Falls, N. Y., a corporation of New York No Drawing. Application June 27, 1955,
Serial No. 518,350

2 Claims. (Cl. 260—648)

This invention relates to a new chemical compound composed of carbon and chlorine, i. e. a perchlorocarbon, having an empirical formula $C_{10}Cl_8$ and a melting point of 345 to 347 degrees centigrade.

The compound of this invention may be prepared by refluxing hexachlorocyclopentadiene, with or without a solvent, at a temperature above about 180 degrees centigrade and below about 300 degrees centigrade, in the absence of a catalyst, such as aluminum chloride, which causes the dimerization of hexachlorocyclopentadiene. The dimerization of hexachlorocyclopentadiene to a compound having the empirical formula $C_{10}Cl_{12}$ is disclosed in the copending application Serial No. 518,340, filed of even date herewith in the name of Arnold N. Johnson.

In preparing the compound of this invention, presumably in accordance with the following equation:

$$2C_5Cl_6 \rightarrow C_{10}Cl_8 + 2Cl_2 \quad (1)$$

a solvent may or may not be employed. If a solvent is used it should be inert with respect to the reactants and reaction products; also, its boiling point should be high enough to allow for sufficiently rapid reaction at the elevated temperatures. It has been found advisable to employ a solvent and to effect the reaction under an inert atmosphere such as nitrogen, carbon dioxide, etc. In this manner the by-product, chlorine, may be diluted and removed from the reaction medium, thereby minimizing the probability of any unreacted hexachlorocyclopentadiene being chlorinated to octachlorocyclopentene in any substantial proportions; and also thereby favoring the completion of the reaction depicted in Equation 1. Among the solvents which may be employed are orthodichlorobenzene, hexachlorobutadiene and other high boiling unreactive materials inert under the conditions employed, such as trichlorobenzene, metadichlorobenzene, dichlorobenzotrifluoride, octachlorocyclopentene, monochlorohexafluoroxylene, etc., and of course, excess hexachlorocyclopentadiene may also be used as the reaction medium.

The reaction temperatures to be employed must be greater than about 180 degrees centigrade and preferably below about 300 degrees centigrade. In order to obtain high conversions the reaction temperature should be preferably on the order of 230 to 270 degrees centigrade. I have found that a temperature of at least about 180 degrees centigrade and that a reflux period of at least 4 hours must be maintained in order to obtain any detectable amount of $C_{10}Cl_8$. At the preferred reaction temperature range the yield of desired product is significant as illustrated herein. The time allowed for reaction will vary with the purity of the reactants, the degree of completion of the desired reaction, the temperature employed, the solvents employed, etc., but under any circumstances must be more than the initial incubation period. The reaction product is preferably purified in order to obtain a substantially white colorless material. Ordinary purification procedures such as recrystallization, washing, absorbent decolorization, etc., may be satisfactorily employd.

It is preferred to effect the reaction at substantially atmospheric pressure in order to obtain high conversion of hexachlorocyclopentadiene to the desired product. Although atmospheric pressure is preferred the application of super-atmospheric pressure does not adversely affect the yield as exemplified hereinafter. The reaction may be effected under vacuum as shown later provided the reaction temperature is maintained above about 180 degrees centigrade.

The compound of this invention is useful as an insecticide and as a fungicide as more fully disclosed hereinafter. In addition, the compound of this invention is useful as a chemical intermediate, as is more fully illustrated in the example given hereinafter, which shows its use as a reactant which may be chlorinated to produce $C_{10}Cl_{12}$ having a melting point of 221 to 223 degrees centigrade which material is disclosed in the copending application Serial No. 518,397, filed of even date herewith in the name of Earl T. McBee and James D. Idol, Jr.

The following examples illustrate methods for the preparation and utility of the compound of this invention; however, they are not to be construed as limiting except as defined in the appended claims.

Example 1—Preparation

One thousand grams of hexachlorocyclopentadiene was charged into a two liter round bottom flask equipped with a thermometer, a reflux condenser and heating and/or cooling means. The reactant was heated to the refluxing temperature which was about 238 degrees centigrade and maintained at a refluxing temperature of between about 238 and 270 degrees centigrade for approximately 28 hours, whereupon the reflux temperature became substantially constant, indicating that the reaction was near completion. Thereafter the reaction mixture, a heavy red-brown oil, was cooled whereupon a large crop of crystals were precipitated. As a result of filtering this oil, the tan crystals recovered were then recrystallized from benzene. Upon drying them at 90 degrees centigrade, 273 grams of a solid white crystalline material was recovered, representing a 45 percent yield by weight, of product. These white crystals were analyzed and found to possess a melting point of about 345 to 347 degrees centigrade, a chlorine content of 70.12 and 70.15 percent by weight, a carbon content of 29.48 percent by weight, which corresponds to $C_{10}Cl_8$ having a theoretical chlorine content of 70.3 percent by weight, a theoretical carbon content of 29.70 percent by weight, respectively.

Example 2

In a manner after Example 1, five hundred grams of hexachlorocyclopentadiene and five hundred grams of hexachlorobutadiene, as a solvent, were charged into a two liter round bottom flask equipped with a thermometer, a reflux condenser and heating and/or cooling means. The mixture was heated to 218 degrees centigrade at which temperature it began to reflux. The reaction mixture was refluxed for a total of 33 hours. On completion of refluxing the mixture was cooled and 178 grams of a solid, white crystalline material was obtained representing a 58 percent yield by weight of crystals. These were analyzed and found to possess a chlorine content of 69.55 percent by weight, which corresponds to the product obtained in Example 1 as further evidenced by favorable mixed melting point tests.

Example 3

In a manner after Example 1, hexachlorocyclopentadiene was charged into a two liter round bottom flask. The reactant was heated to the refluxing temperature required at a pressure of two atmospheres for approximately 28 hours, whereupon the reflux temperature became substantially constant, indicating that the reaction was near completion. Thereafter the reaction mixture was cooled and the product recovered by recrystallization as exemplified in Example 1. When the product was admixed with an equal portion of crystals prepared as in Example 1 no depression of the melting point was observed.

Example 4

In a manner after Example 1, hexachlorocyclopentadiene was charged into a two liter round bottom flask. The reactant was heated at a pressure of approximately 180 millimeters and a temperature of about 180 degrees centigrade, for approximately 28 hours whereupon the reflux temperature became substantially constant indicating that the reaction was near completion. Thereafter the reaction mixture was cooled and the product recovered by recrystallization as exemplified in Example 1. When the product was admixed with an equal portion of crystals prepared as in Example 1, no depression of the melting point was observed.

Example 5

In a manner after Example 1, hexachlorocyclopentadiene was charged into a two liter round bottom flask containing metallic nickel. The reactant was heated to the reflux temperature which was about 238 degrees centigrade and maintained at a refluxing temperature of between about 238 to 272 degrees centigrade for approximately 28 hours whereupon the reflux temperature became substantially constant, indicating that the reaction was near completion. Thereafter, the reaction mixture was cooled and the crystals were recovered as exemplified in Example 1. When the product, approximately 45 percent yield by weight, was admixed with an equal portion of crystals prepared as in Example 1, no depression of melting point was observed.

Example 6

In a manner after Example 1, hexachlorocyclopentadiene was charged into a two liter round bottom flask containing metallic lead. The reactant was heated to the refluxing temperature which was about 238 degrees centigrade and maintained at a refluxing temperature of between about 238 to 274 degrees centigrade for approximately 28 hours, whereupon the reflux temperature became substantially constant, indicating that the reaction was near completion. Thereafter, the reaction mixture, a heavy black liquid was cooled, then the crystals which were precipitated were recrystallized as in Example 1 and resulted in a 10 percent yield of $C_{10}Cl_8$.

Example 7

In a manner after Example 1, hexachlorocyclopentadiene was charged into a two liter round bottom flask containing metallic iron. The reactant was heated to the refluxing temperature which was about 238 degrees centigrade and maintained at a refluxing temperature of between about 238 to 271 degrees centigrade for approximately 28 hours, whereupon the reflux temperature became substantially constant, indicating that the reaction was near completion. Thereafter, the reaction mixture, a heavy black liquid which contained byproducts as a result of iron chloride formed during the liberation of chlorine, was cooled. Then the crystals which were precipitated were recrystallized as in Example 1 and resulted in a 13 percent yield of $C_{10}Cl_8$.

Example 8.—Use as chemical intermediate

Ten grams of $C_{10}Cl_8$ and 50 cc. of carbon tetrachloride were charged to a Vycor tube approximately 5 centimeters in diameter by 30 centimeters in length. Only a small amount of the solid dissolved in the carbon tetrachloride. The tube was irradiated with ultraviolet light and gaseous chlorine was bubbled through the charge for eight hours. A substantial portion of the $C_{10}Cl_8$ was dissolved at the end of the eight-hour period indicating that a reaction had occurred. The solution was purged of chlorine, then filtered to remove unreacted $C_{10}Cl_8$ and the filtrate allowed to evaporate overnight. The remaining crystalline residue was recrystallized from a 50:50 benzene-acetic acid mixture giving 8 grams of $C_{10}Cl_{12}$ representing a 70 percent conversion and 84 percent yield by weight. Three grams of $C_{10}Cl_8$ was recovered. The $C_{10}Cl_{12}$ had a melting point of 221 to 223 degrees centigrade and gave no depression in melting point when mixed with an authentic sample of $C_{10}Cl_{12}$ (melting point 221 to 223 degrees centigrade).

Example 9.—Use as insecticide

A 25 percent by weight dust of the perchlorocarbon, $C_{10}Cl_8$, prepared in a manner after Example 1 having a melting point of 345 to 347 degrees centigrade was made by intimately mixing the perchlorocarbon with a solid inert carrier, such as talc. This formulation which had the $C_{10}Cl_8$ as the only insecticidal active ingredient, produced a 100 percent knock-down in a period of twenty-four hours, when applied in a contact knock-down test to the confused flour beetle (*Tribolium confusum*). This indicates the usefulness of the compound as an ingredient in insecticidal compositions, contributing high knock-down quality thereto. The dust is equally effective against other species of insects and this example is not to be construed as limiting the insecticidal usefulness of the compound.

Example 10.—Use as fungicide

For fungicide testing, the compound may be applied as a spray in a liquid carrier either as a solution in a solvent or as a suspension in a non-solvent such as water. One part of $C_{10}Cl_8$ prepared in a manner after Example 1 and a wetting agent such as octadecanol were mixed with 400 parts of a non-solvent such as water. The mixture was applied as a spray to *Glomerella cingulata* spores resulting in preventing germination of 50 percent of the test spores so treated. This indicates the usefulness of the compound as an ingredient in fungicide compositions contributing sporacide qualities thereto.

It is to be understood that the invention is not limited to the specific examples which have been offered merely as illustration and that modification may be made within the scope of the appended claims without departing from the spirit of the invention.

I claim:
1. A halocarbon having the empirical formula $C_{10}Cl_8$ and a melting point of 345 to 347 degrees centigrade.
2. The process for preparing a halocarbon having the empirical formula $C_{10}Cl_8$ and a melting point of 345 to 347 degrees centigrade which comprises heating hexachlorocyclopentadiene as the sole reactant at a temperature above about 180 degrees centigrade and below about 300 degrees centigrade in the absence of a catalyst which causes the dimerization of hexachlorocyclopentadiene.

References Cited in the file of this patent
UNITED STATES PATENTS

| | | |
|---|---|---|
| 2,606,910 | Herzfeld et al. | Aug. 12, 1952 |
| 2,732,409 | Ladd | Jan. 24, 1956 |